United States Patent
Mori et al.

(10) Patent No.: US 8,528,688 B2
(45) Date of Patent: Sep. 10, 2013

(54) LOCK DEVICE AND ELECTRIC POWER STEERING SYSTEM

(75) Inventors: Yutaka Mori, Toyohashi (JP); Yoshiyuki Shibata, Toyota (JP)

(73) Assignee: JTEKT Corporation, Osaka (JP)

( * ) Notice: Subject to any disclaimer, the term of this patent is extended or adjusted under 35 U.S.C. 154(b) by 61 days.

(21) Appl. No.: 13/292,711

(22) Filed: Nov. 9, 2011

(65) Prior Publication Data

US 2012/0118663 A1    May 17, 2012

(30) Foreign Application Priority Data

Nov. 16, 2010    (JP) .................................. 2010-255737
Apr. 25, 2011    (JP) .................................. 2011-097123

(51) Int. Cl.
  *B60R 25/02*    (2013.01)
(52) U.S. Cl.
  USPC .............. 180/444; 70/252; 335/234; 335/229
(58) Field of Classification Search
  USPC ................... 180/444; 70/252; 335/234, 229
  See application file for complete search history.

(56) References Cited

U.S. PATENT DOCUMENTS

| | | | |
|---|---|---|---|
| 3,022,450 A | 2/1962 | Chase, Jr. | |
| 6,354,395 B1 * | 3/2002 | Cheng et al. | 180/444 |
| 6,794,768 B2 | 9/2004 | Uselli | |
| 7,009,479 B1 | 3/2006 | Chung et al. | |
| 2002/0148262 A1 | 10/2002 | Okuno | |
| 2003/0231100 A1 * | 12/2003 | Chung | 340/5.2 |
| 2004/0201441 A1 | 10/2004 | Elendt et al. | |

FOREIGN PATENT DOCUMENTS

| | | |
|---|---|---|
| EP | 0 794 540 A1 | 10/1997 |
| EP | 1 308 356 A1 | 5/2003 |
| EP | 1 421 591 B1 | 10/2007 |
| JP | A-2001-219816 | 8/2001 |
| JP | A-2002-308049 | 10/2002 |
| JP | A-2006-044485 | 2/2006 |
| JP | A-2007-308100 | 11/2007 |

OTHER PUBLICATIONS

Feb. 28, 2012 Extended European Search Report issued in European Patent Application No. 11189004.2.

* cited by examiner

*Primary Examiner* — Kevin Hurley
*Assistant Examiner* — Michael Stabley
(74) *Attorney, Agent, or Firm* — Oliff & Berridge, PLC (57) ABSTRACT

A lock device that restricts movement of a movable body includes: a lock member that is engageable with an engagement portion formed at the movable body; an urging member that urges the lock member in a direction away from the engagement portion; and an actuator that moves the lock member toward the engagement portion to engage the lock member with the engagement portion against an urging force generated by the urging member.

8 Claims, 10 Drawing Sheets

LOCK DEVICE AND ELECTRIC POWER STEERING SYSTEM

INCORPORATION BY REFERENCE

The disclosure of Japanese Patent Applications No. 2010-255737 filed on Nov. 16, 2010 and No. 2011-097123 filed on Apr. 25, 2011 including the specification, drawings and abstract is incorporated herein by reference in its entirety.

BACKGROUND OF THE INVENTION

1. Field of the Invention

The invention relates to a lock device and an electric power steering system.

2. Description of Related Art

Conventional lock devices are described in, for example, Japanese Patent Application Publication No. 2001-219816 (JP 2001-219816) and Japanese Patent Application Publication No. 2002-308049 (JP 2002-308049).

JP 2001-219816 describes a column-type electric power steering system provided with a steering lock device. An engagement portion is formed at a worm shaft side (input side), the worm shaft transmitting the rotation of an electric motor to a speed reducer, or at an electric motor output shaft side. A locked state is achieved by inserting a lock member into the engagement portion, and an unlocked state is achieved by removing the lock member from the engagement portion.

The lock member is advanced or retracted with the use of an elastic member that urges (advances) the lock member toward the engagement portion and an actuator that attracts the lock member to remove (retract) the lock member from engagement portion. The lock member is advanced or retracted in the following manner. When an ignition key is turned on, electric current application to a solenoid that serves as the actuator and that is fixed to a casing is controlled. Thus, an attraction force that counteracts an urging force generated by the elastic member is generated to retract the lock member provided with a moving core so that the lock member is removed from the engagement portion. As a result, the unlocked state is achieved. When the ignition key is turned off, attraction of the moving core by the solenoid is stopped, and the lock member is advanced toward the engagement portion by an urging force generated by the elastic member. As a result, the lock member is engaged with the engagement portion, whereby the locked state is achieved.

As described above, the locked state and the unlocked state are achieved at the electric motor output shaft side or at the worm shaft side that is the input side of the speed reducer (i.e., at a stage prior to output of assist torque based on the torque applied to a steering wheel). Thus, in the locked state where the lock member is engaged with the engagement portion, a large force based on the torque applied to the steering wheel is no longer applied directly to the lock member, which enables downsizing of the lock member.

However, when the ignition switch is on, electric current is applied to a coil to retract the lock member from the engagement portion. Therefore, if, for example, breakage of a harness, disconnection of a connector, or an instantaneous reduction in battery voltage occurs, electric current application to the coil is stopped. As a result, the lock member is advanced and engaged with the engagement portion due to an urging force generated by the elastic member. In some cases, the steering wheel may be locked while a vehicle is traveling. With this regards, there is still room for improvement.

JP 2002-308049 describes a structure in which a key portion and a lock mechanism portion of a steering shaft are unitized so as to be mechanically linked to each other. In the structure, a cam member that rotates together with a key rotor is provided between the key rotor and the lock mechanism portion of the steering shaft and extends to the lock mechanism portion coaxially with the key rotor. A locking lever that is linked to insertion and removal of the key is provided. When the key is turned from ACC position to LOCK position, the cam member is operated. In accordance with the operation of the cam member, the lock member that is provided at the lock mechanism on the steering shaft side is operated and is brought to a state where the lock member can be locked with the steering shaft. When the key is removed from LOCK position, the locking lever is operated. In accordance with the operation of the locking lever, the lock member is operated to be inserted in a groove of the steering shaft. Thus, the locked state is achieved.

JP 2002-308049 A describes the structure in which the key portion and the lock mechanism portion of the steering shaft are unitized so as to be mechanically liked to each other. Therefore, if the key portion is provided at an instrument panel at a driver's seat, the lock mechanism portion is located in front of the knee of a driver, which may impose restrictions on the strength and installation position of the lock mechanism portion.

In order to address this problem, the following configuration may be employed. An operation portion such as a key device and an actuator portion such as a lock mechanism are separated from each other. A lock member at the lock mechanism is moved to the lock position by a spring member. When the key is inserted and turned to ACC position (when locking is cancelled), the fact that the key is turned to ACC position is detected by, for example, detection unit, and drive unit such as a motor is driven based on a detection signal to move the lock member to the locking cancellation position.

A device is required which maintains the locking cancellation state so that the locking operation is not erroneously performed in the locking cancellation state where locking by the lock member is cancelled. Conventionally, the key portion and the lock mechanism portion of the steering shaft are mechanically linked to each other. Therefore, as long as the key rotor is at a predetermined rotation position, the locking cancellation state where locking by the lock member is cancelled is maintained by the cam member.

In the above-described structure where the operation portion such as the key device and the actuator portion such as the lock mechanism are separated from each other, there is no cam member. Accordingly, it is necessary to provide a device that maintains the locking cancellation state, at the actuator portion. For example, a locking cancellation maintaining member is attached to a plunger of a solenoid, which is an electric drive unit. An electric signal is generated based on the operation of the operation portion, the solenoid is driven according to the electric signal, and the locking cancellation state in which locking by the lock member is cancelled is maintained by the locking cancellation maintaining member. However, in the structure in which the locking cancellation maintaining member is operated by electric drive unit such as a solenoid, malfunction due to an electrical problem (e.g., breakage of a harness, disconnection of a connector, or an instantaneous reduction in battery voltage) may occur. In this regard, there is still room for improvement.

SUMMARY OF THE INVENTION

It is an object of the invention to provide a lock device that is able to reliably maintain the locked state with low power consumption while operating a lock cancellation maintaining member using an electric drive unit without being affected by an electrical trouble.

An aspect of the invention relates to a lock device that restricts movement of a movable body. The lock device includes: a lock member that is engageable with an engagement portion formed at the movable body; an urging member that urges the lock member in a direction away from the engagement portion; and an actuator that moves the lock member toward the engagement portion to engage the lock member with the engagement portion against an urging force generated by the urging member.

With the configuration described above, even if electric current application to a coil or electric current application to the actuator is stopped due to an electrical trouble, for example, breakage of a harness, disconnection of a connector or an instantaneous drop in battery voltage, it is possible to maintain the disengaged state by moving the lock member using the urging member.

As a result, even if electric current application is stopped, the lock member is maintained in the disengaged state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is a view showing the state where the lock pin has advanced from the unlock end in FIG. 9 and a lock detection switch is turned on;

DETAILED DESCRIPTION OF EMBODIMENTS

Figure 1:
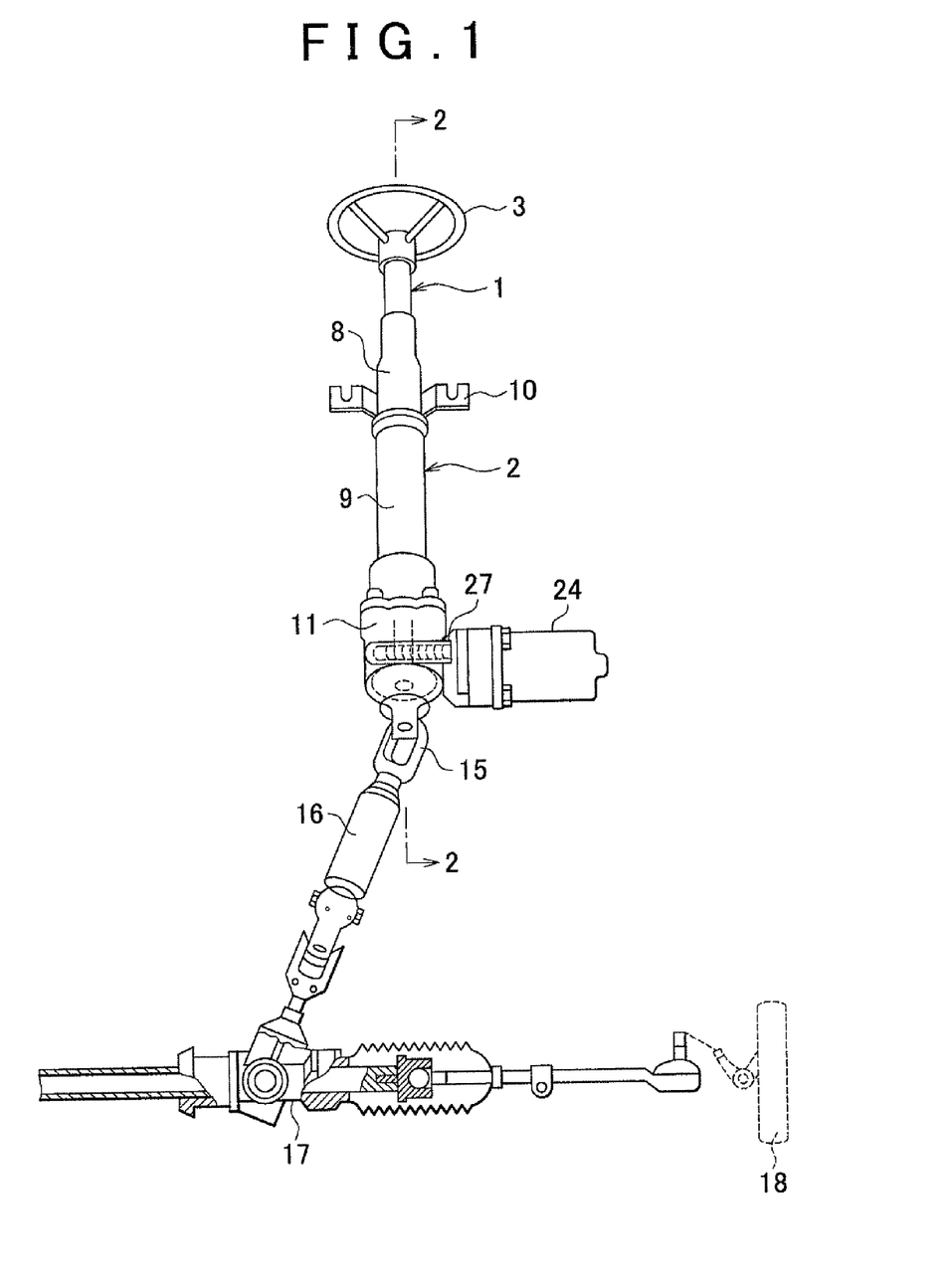
FIG. 1 is an overall view of an electric power steering system according to an embodiment of the invention.
Figure 2:
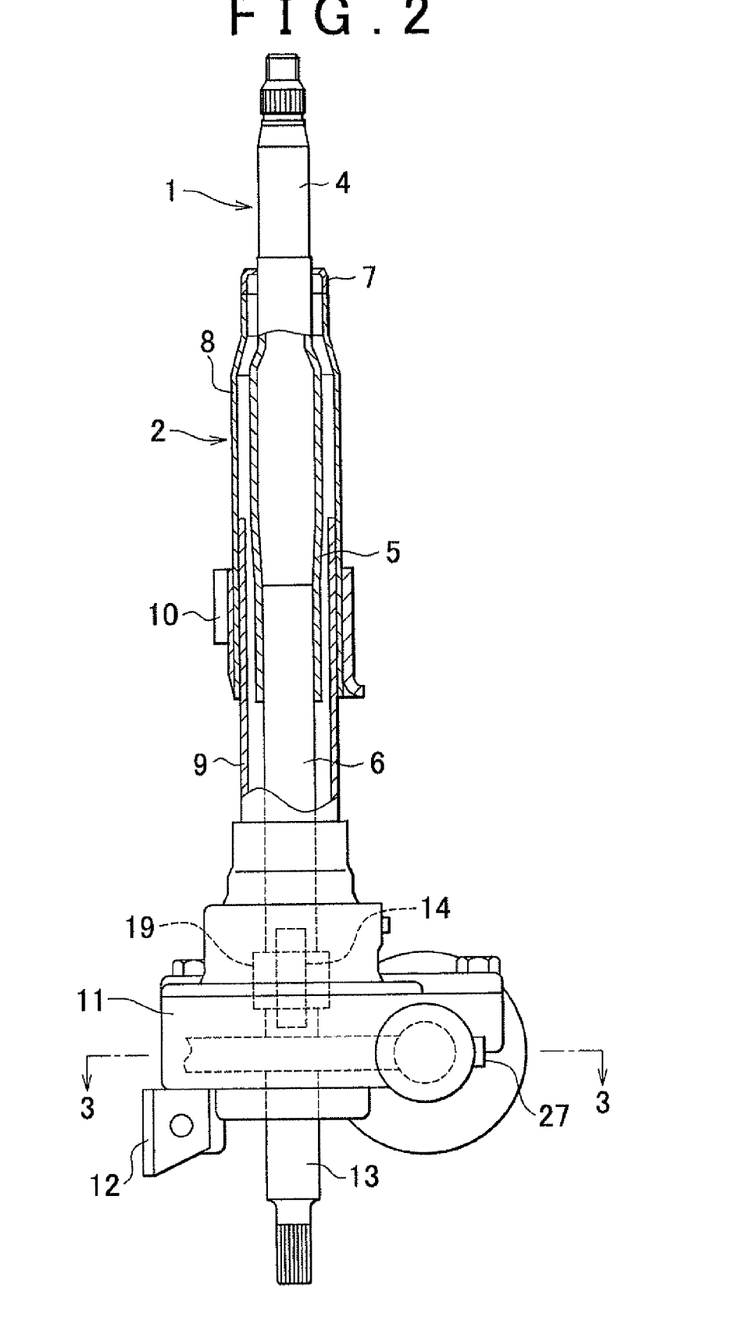
FIG. 2 is a partial sectional view which is taken along the line II-II in FIG. 1, and from which a steering wheel and a universal joint are omitted.

Hereafter, an embodiment of the invention will be described with reference to the accompanying drawings. As shown in FIG. 1 and FIG. 2, an input shaft 1 of an electric power steering system is rotatably supported by a steering column 2. The input shaft 1 includes an upper shaft 4 and a lower shaft 6. A steering wheel 3 is attached to the upper shaft 4. The lower shaft 6 is fitted in a tubular portion 5 formed at a lower end portion of the upper shaft 4 such that relative rotation between the lower shaft 6 and the tubular portion 5 is restricted and such that relative displacement between the tubular portion 5 and the lower shaft 6 in the axial direction is allowed if an axial force equal to or larger than a predetermined value is applied. Accordingly, if a driver hits the steering wheel 3 upon a vehicle collision and an axial force equal to or larger than the predetermined value is applied to the input shaft 1, the upper shaft 4 is displaced relative to the lower shaft 6 in the axial direction. Thus, impact energy is absorbed.

The steering column 2 includes a tubular upper column 8 and a tubular lower column 9. The upper column 8 rotatably supports the upper shaft 4 via a bearing 7. The lower column 9 is fitted at its upper end portion to the inner periphery of a lower end portion of the upper column 8. An upper bracket 10 is used to fit the upper column 8 to a vehicle body. If a vehicle collision occurs and the upper column 8 is moved forward due to an impact, the upper bracket 10 is removed from the vehicle body, thus allowing the upper column 8 and the upper shaft 4 to move forward.

A housing 11 is fixed to a lower end of the lower column 9, and fitted to the vehicle body via a lower bracket 12. An output shaft 13 is an output member rotatably supported by the housing 11, and is connected to the lower shaft 6 via a torsion bar 14. The output shaft 13 is connected to steered wheels 18 via, for example, a universal joint 15, an intermediate shaft 16, and a rack and pinion mechanism 17. A torque detector 19 detects a steering torque that is applied to the input shaft 1 via the steering wheel 3. The steering torque is detected by electrically measuring a minute relative rotational displacement between the input shaft 1 and the output shaft 13, which is proportional to torsion of the torsion bar 14 due to the steering torque.

Figure 3:
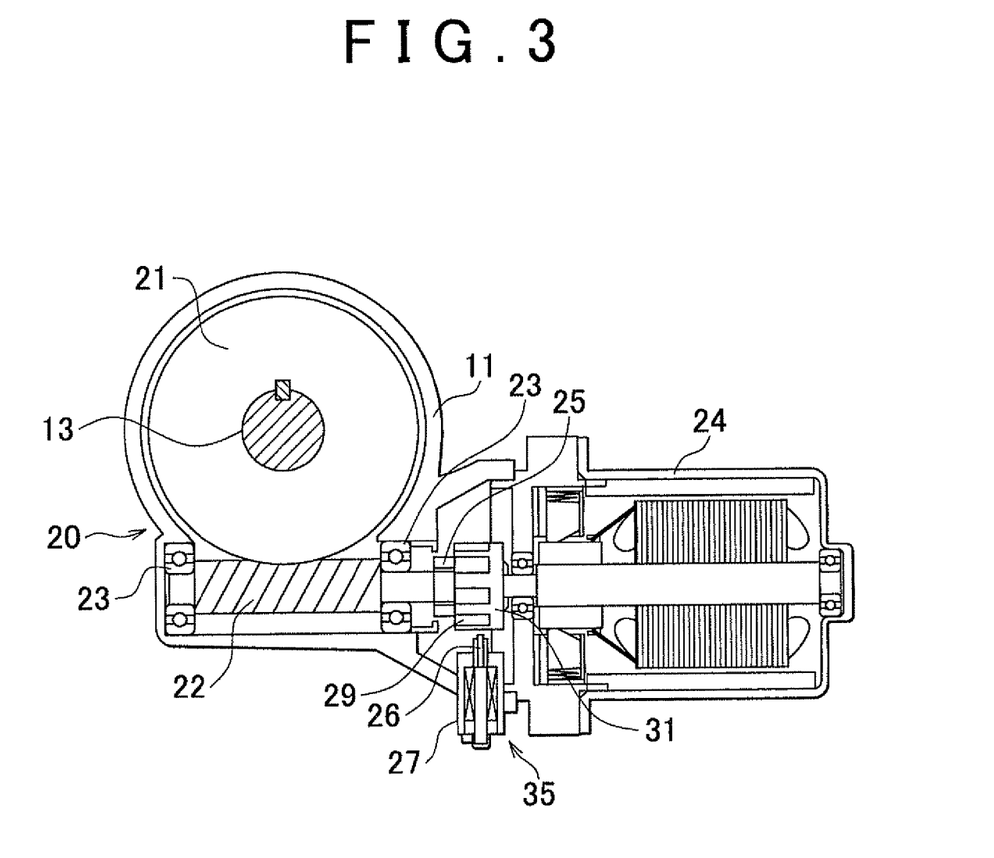
FIG. 3 is a sectional view taken along the line III-III in FIG. 2.

As shown in FIG. 3, a wheel gear 21 of a speed reducer 20 is fixed to the output shaft 13. A worm shaft (input member of the speed reducer 20) 22 is rotatably supported by the housing 11 at both ends via bearings 23, and is in mesh with the wheel gear 21. An electric motor 24 is fixed to the housing 11. An output shaft 25 that serves as a rotational output member of the electric motor 24 is spline-connected to the worm shaft 22. A ring 31 having a plurality of lock holes (engagement portions) 29 in its periphery is fitted to the output shaft 25. A steering lock device (lock device) 35 is fixed to the housing 11. The steering lock device 35 places the output shaft 25 in the locked state by inserting a lock pin (lock member) 26 into the lock hole 29 formed in the ring 31 fitted to the output shaft 25, and places the output shaft 25 in the unlocked state by removing the lock pin 26 from the lock hole 29.

Figure 4:
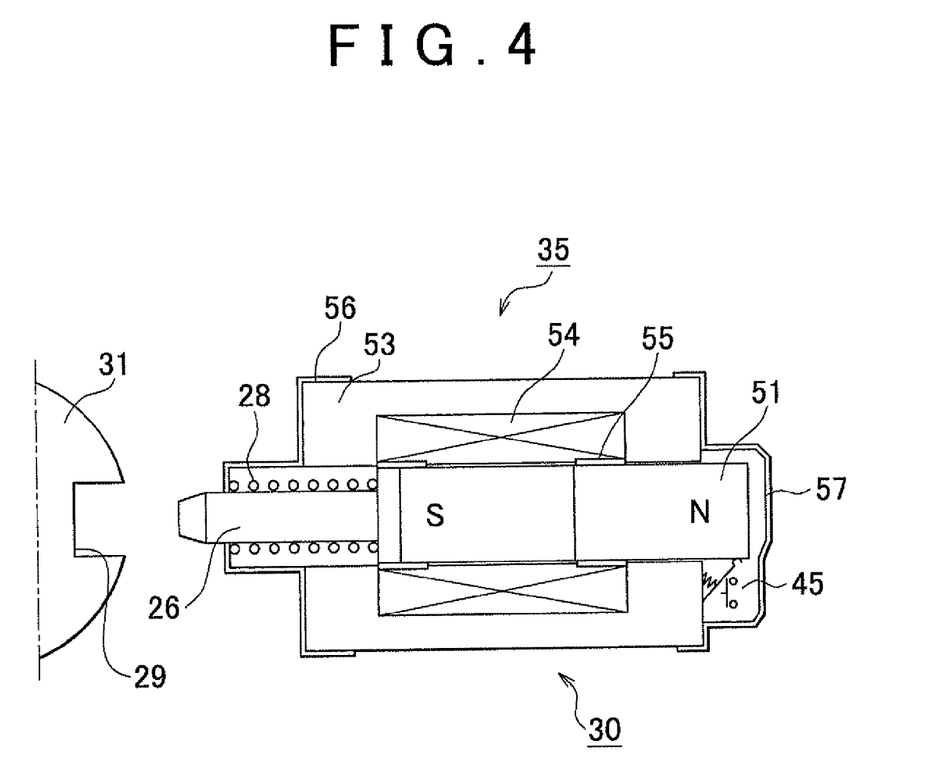
FIG. 4 is a view showing the structure of a steering lock device.

Next, the structure of the steering lock device 35 will be described with reference to FIG. 4. The steering lock device 35 includes an actuator 30 and the ring 31. The actuator 30 causes the lock pin 26 to advance toward the lock hole 29 or to retract from the lock hole 29. The ring 31 is fitted to the output shaft 25 of the motor 24, and has the multiple lock holes 29 in its periphery.

The actuator 30 has a plunger 51 that is secured to the lock pin 26 so as to move together with the lock pin 26. The plunger 51 is formed of a magnet with one pole pair. For example, as shown in FIG. 4, the left side portion of the plunger 51 is the south pole, and the right side portion of the plunger 51 is the north pole.

A coil 52 is wound around the plunger 51 to generate an electromagnetic force for advancing or retracting the lock pin 26. The coil 54 is surrounded by a yoke 53 that serves as a magnetic path for an electromagnetic force generated by the coil 54.

Two bushes 55 are provided between the plunger 51 and the coil 54. Thus, the plunger 51 is smoothly advanced or retracted by an electromagnetic force generated by the coil 54.

A front portion of the actuator 30 is covered with a front cover 56. A compression spring (urging member) 28, which is used to remove the lock pin 26 from the lock hole 29 formed in the ring 31 fitted to the output shaft 25 of the electric motor 24, is provided between the front cover 56 and the left end of the plunger 51.

A rear portion of the actuator 30 is covered with a rear cover 57. A lock detection switch (lock detection unit) 45, which detects the state of engagement of the lock pin 26 with the lock hole 29 based on the position of the plunger 51, is provided between the rear rover 57 and the yoke 53.

Figure 5:
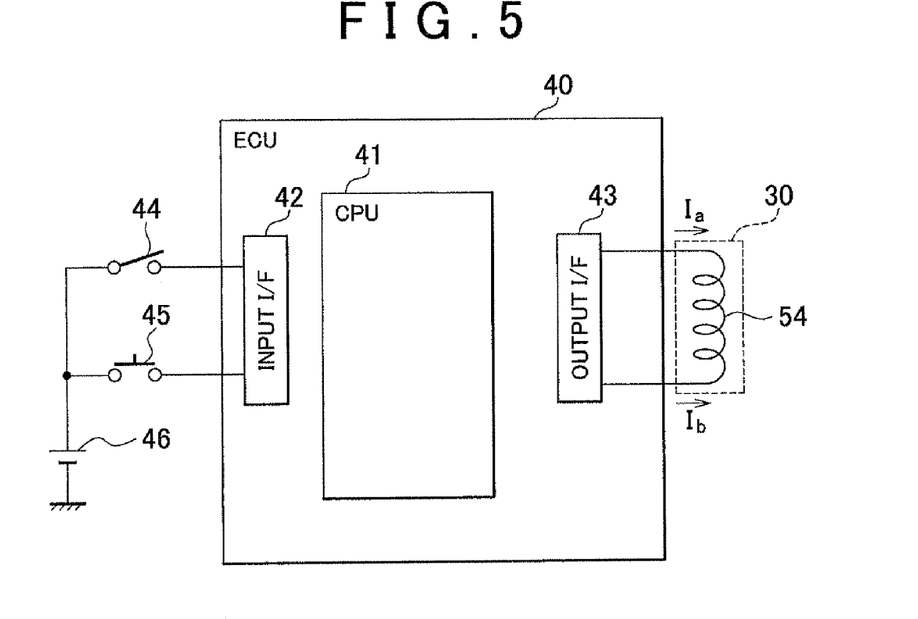
FIG. 5 is an electrical diagram for the steering lock device.

Next, the electrical configuration of the steering lock device 35 will be described with reference to FIG. 5. A control unit for the steering lock device 35 includes an ECL 40 that is a main control portion, a battery 46, an ignition switch 44, the lock detection switch 45, and the actuator 30.

The ECU 40 includes a CPU 41 that executes control processes, an input interface (I/F) 42, and an output interface (I/F) 43. The input interface 42 receives signals from the ignition switch 44 and the lock detection switch 45. The output interface 43 outputs electric current to the actuator 30.

Next, the operations of the steering lock device 35 and the ECU 40 for the steering lock device 35 will be described with reference to FIGS. 6, 7 and 8.

Figure 6:
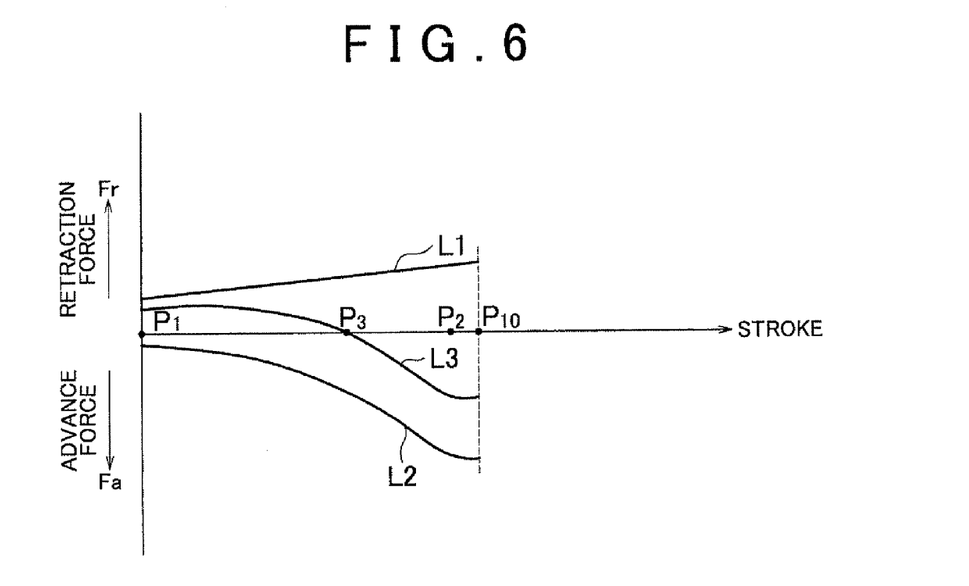
FIG. 6 is a graph showing the relationship between a stroke of a lock pin of the steering lock device and forces that act on the lock pin while electric current is not applied.

With regard to the ordinate axis in FIG. 6, the upward arrow represents a retraction force Fr for retracting the lock pin 26 from the lock hole 29 (placing the lock pin 26 in the disengaged state), and the downward arrow represents an advance force for advancing the lock pin 26 toward the lock hole 29.

The abscissa axis represents a stroke of the lock pin 26. When the lock pin 26 is in the state shown in FIG. 4, the stroke is zero. The stroke in this state is indicated by an unlock end (retraction end) P1. As the lock pin 26 moves toward a lock end (advance end), the value of stroke shifts rightward on the abscissa axis.

L1 indicates the relationship between the stroke of the lock pin 26 and a retraction force Fr, generated by the compression spring 28, for retracting the lock pin 26 from the lock hole 29. L2 indicates an attraction force that acts between the magnet with one pole pair, which constitutes the plunger 51, and the yoke 53. The attraction force acts as an advance force Fa for advancing the lock pin 26 toward the lock hole 29.

L3 indicates a resultant of L1 and L2 while electric current is not applied to the coil 54, that is, a resultant of the retraction force Fr generated by the compression spring 28 and the attraction force (advance force) Fa that acts between the plunger 51 and the yoke 53. P3 indicates a balance point at which the retraction force Fr generated by the compression spring 28 and the advance force Fa that acts between the plunger 51 and the yoke 53 cancel out each other. P10 indicates a position to which the lock pin 26 is allowed to be advanced maximally by the resultant of the retraction force Fr generated by the compression spring 28 and the attraction force Fa that acts between the magnet of the plunger 51 and the yoke 53. Note that, the lock pin 26 is configured to mechanically stop at the lock end (advance end) P2, therefore, the lock pin 26 never reaches P10.

Between P1 and P3, the retraction force Fr is larger than the advance force Fa, and therefore a force for retracting the lock pin 26 acts on the lock pin 26. Between P3 and P10, the advance force Fa is larger than the retraction force Fr, and therefore a force for advancing the lock pin 26 acts on the lock pin 26.

As a result, when the value of stroke is on the left side of P3, the lock pin 26 is pushed by the retraction force Fr generated by the compression spring 28 such that the lock pin 26 is directed toward the unlock end (retraction end) P1. That is, the unlocked state is achieved.

Figure 7:
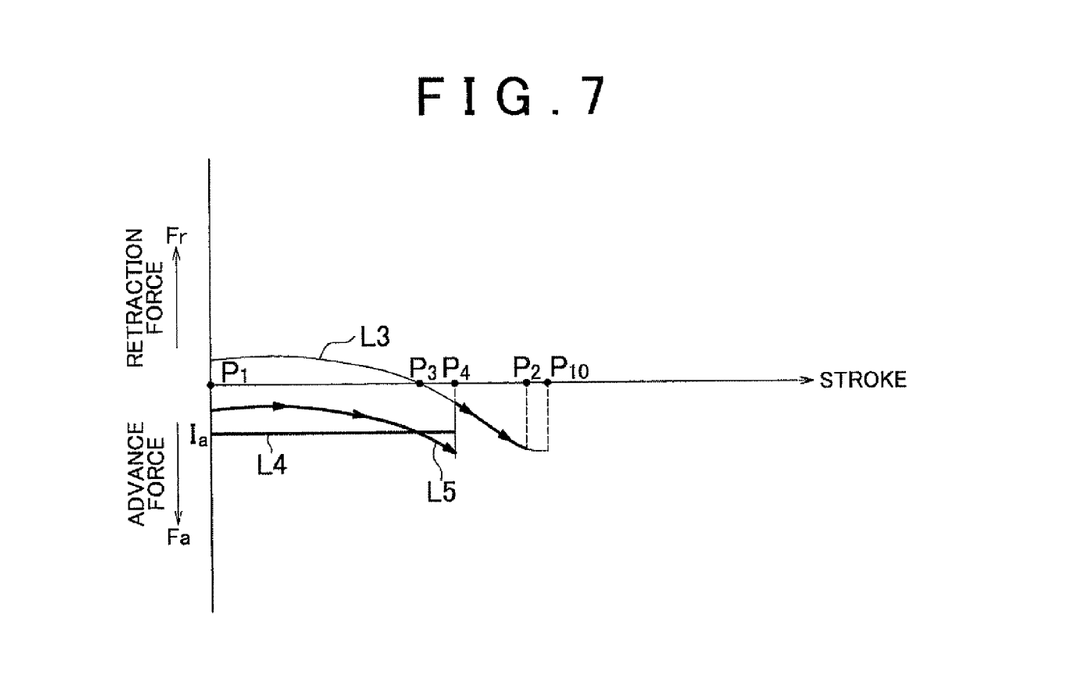
FIG. 7 is a graph showing the relationship between a stroke of the lock pin of the steering lock device and forces that act on the lock pin while electric current is applied to achieve the locked state.

Next, as indicated by L4 in FIG. 7, a lock pin advancing current Ia is applied to the coil 54 of the actuator 30 by the ECU 40 to apply the advance force Fa that overcomes the retraction force Fr generated by the compression spring 28 to the lock pin 26. Then, the lock pin 26 is advanced by a resultant (indicated by L5) of the advance force Fa indicated by L4 and the retraction force Fr indicated by L3.

The lock pin advancing current Ia is shut off at a stroke (e.g., P4) at which the lock pin 26 is able to be advanced even when electric current is not applied to the coil 54 of the actuator 30 by the ECU 40 as shown by L3. Then, the advance force Fa is shifted from the advance force Fa indicated by L5 to the advance force Fa indicated by L3 at P4. However, the advance force Fa continuously acts on the lock pin 26 to bring the lock pin 26 to the lock end (advance end) P2 at which the lock pin 26 mechanically stops, and the lock pin 26 is maintained at the lock end P2 (engaged state). That is, the locked state is achieved. As described later in detail (see FIG. 15), whether the lock pin 26 has reached P4 is determined based on a signal from the lock detection switch 45 and a value indicated by a lock pin advance checking timer Tr1. More specifically, when the lock pin 26 reaches P4, the lock pin 26 is in an immediately-before engaged state that is a state achieved immediately before the engaged state where the tip of the lock pin 26 reaches the lock end of the lock hole 29 formed in the ring 31. As a result, the lock pin advancing current Ia is shut off at P4. Therefore, steering lock is achieved in the electric power steering system with lower power consumption.

Figure 8:
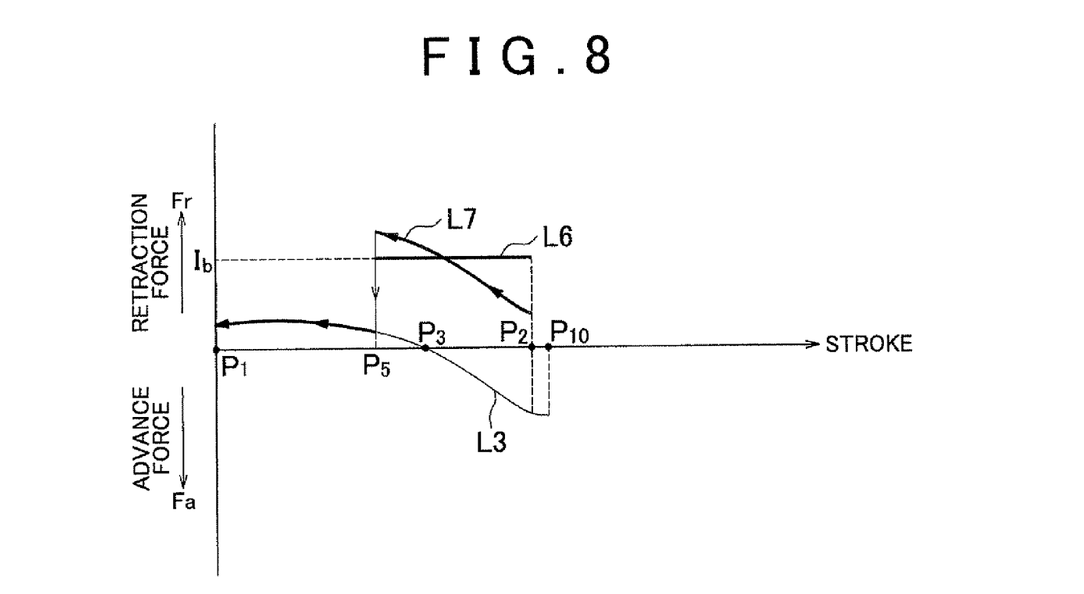
FIG. 8 is a graph showing the relationship between a stroke of the lock pin of the steering lock device and forces that act on the lock pin while electric current is applied to achieve the unlocked state.

As indicated by L6 in FIG. 8, a lock pin retracting current Ib is applied to the coil 54 of the actuator 30 by the ECU 40 to apply the retraction force Fr that overcomes the resultant of the compressing spring force and the attraction force that acts between the magnet that constitutes the plunger 51 and yoke 53. With the resultant, steering lock has been maintained. Then, the lock pin 26 is retracted by a resultant (indicated by L7) of the retraction force Fr indicated by L6 and the advance force Fa indicated by L3.

The lock pin retracting current Ib is shut off at a stroke (e.g., P5) at which the lock pin 26 is able to be retracted even when electric current is not applied to the coil 54 of the actuator 30 by the ECU 40 as shown by L3. Then, the retraction force Fr is shifted from the retraction force Fr indicated by L7 to the retraction force Fr indicated by L3 at P5. However, the retraction force Fr continuously acts on the lock pin 26 to bring the lock pin 26 to the unlock end (retraction end) P1 at which the lock pin 26 mechanically stops, and the lock pin 26 is maintained at the unlock end P1. As described later in detail (see FIG. 15), whether the lock pin 26 has reached P5 is determined based on a signal from the lock detection switch 45 and a value indicated by a lock pin retraction checking timer Tr2.

Next, transition of the steering lock device 35 from the unlocked state to the locked state and transition of the steering lock device 35 from the locked state to the unlocked state will be described with reference to FIG. 9 to FIG. 14.

Figure 9:
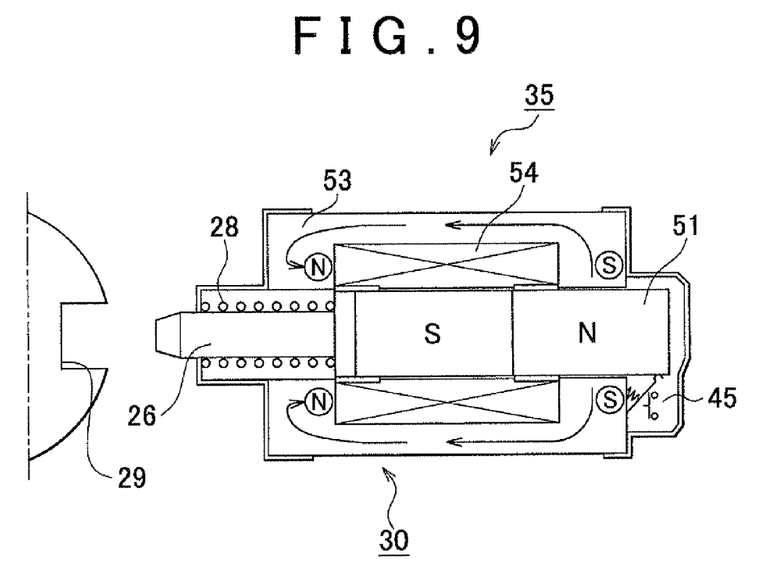
FIG. 9 is a view showing the state where the lock pin of the steering lock device is about to start advancing from the unlock end.

As shown in FIG. 9, in the state where the plunger 51 secured to the lock pin 26 so as to move together with the lock pin 26 is standstill at the unlock end P1, electric current is applied to the coil 54 of the actuator 30 by the ECU 40. Electric current is applied to the coil 54 of the actuator 30 in such a direction that the north pole is formed in the left side portion of the yoke 53 and the south pole is formed in the right side portion of the yoke 53 (see Ia in FIG. 5). Thus, the south pole of the plunger 51 is attracted to the north pole formed in the yoke 53, and the plunger 51 is advanced toward the lock hole 29.

Figure 10:
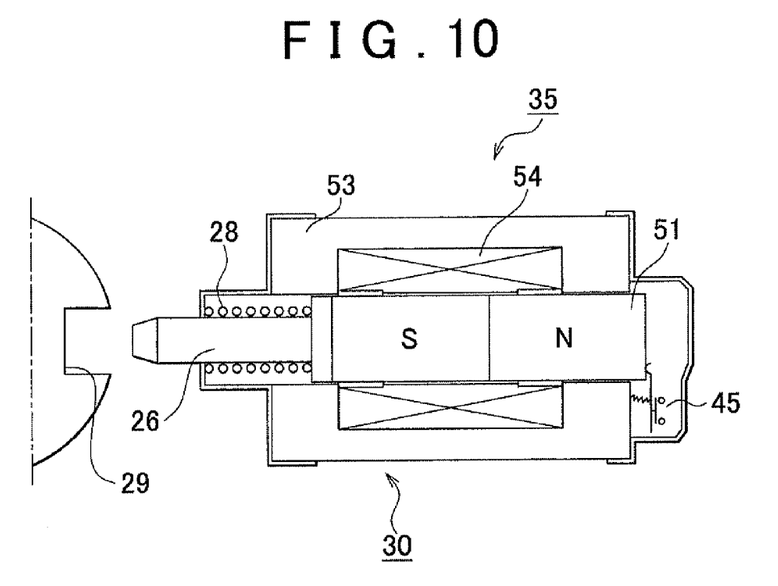
Figure 11:
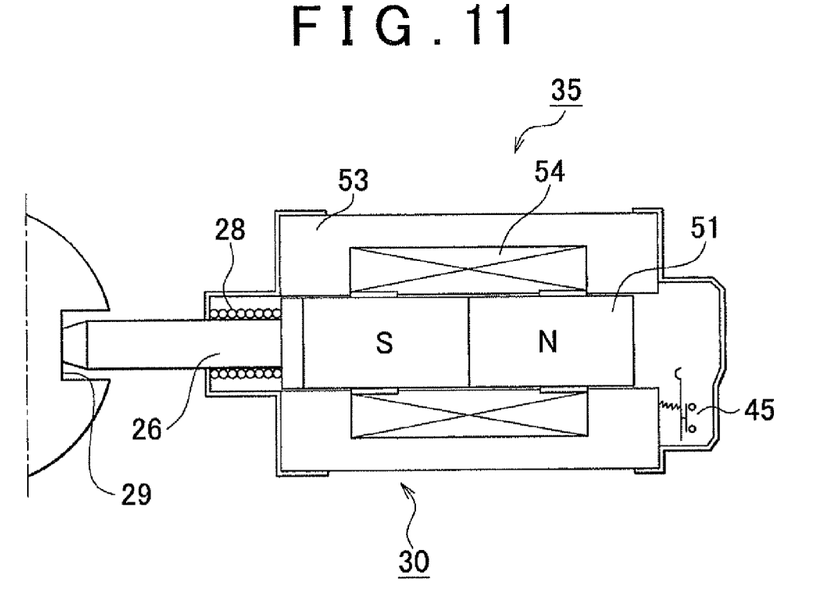
FIG. 11 is a view showing the state where the lock pin has further advanced and come close to the lock end.

When the plunger 51 is advanced to a predetermined position (P4 in FIG. 7), the lock detection switch 45 is turned on as shown in FIG. 10. Therefore, based on a signal from the lock detection switch 45 and a value indicated by the lock pin advance checking timer Tr1, electric current application to the coil 54 of the actuator 30 is stopped by the ECU 40. The south pole of the plunger 51 has been attracted to the north pole formed in the yoke 53, and thus the plunger 51 has been advanced. However, the north pole that has been formed in the yoke 53 disappears when electric current application to the coil 54 is stopped.

However, even if electric current application to the coil 54 of the actuator 30 is stopped by the ECU 40 when the lock pin 26 reaches the predetermined position (P4 in FIG. 7), a magnetic force acts between the plunger 51 formed of the magnet with one pole pair and the yoke 53 made of magnetic material. Thus, the lock pin 26 is advanced to the lock end P2 against a spring force of the compression spring 28, and the lock pin 26 is maintained at the lock end P2 (see FIG. 11). The lock pin advancing current Ia is shut off at P4. Therefore, it is possible to achieve steering lock in the electric power steering system with lower power consumption.

Figure 12:
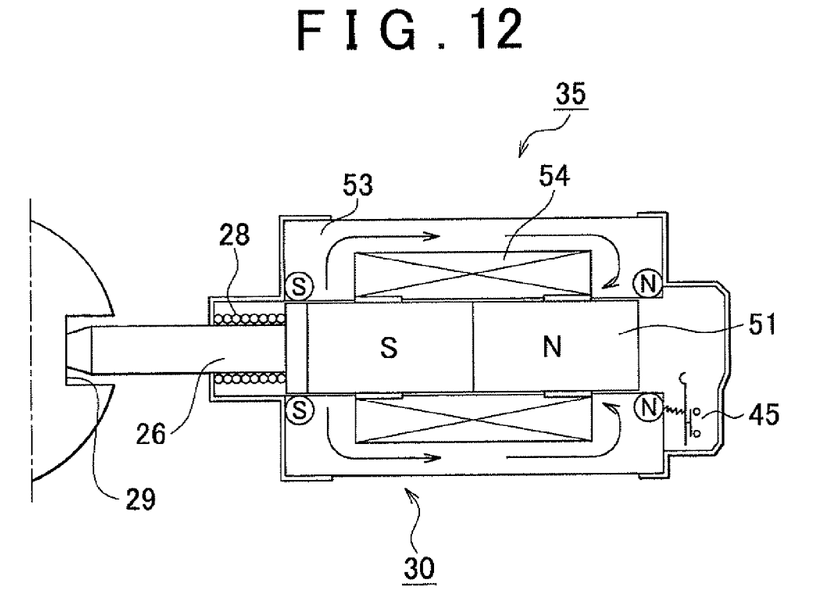
FIG. 12 is a view showing the state where the lock pin is about to start retracting from the lock end.

Next, if the ignition switch 44 is turned on when the plunger 51 is stopped at the lock end P2 as shown in FIG. 12, electric current is applied to the coil 54 of the actuator 30 by the ECU 40. Electric current is applied to the coil 54 of the actuator 30 in such a direction that the south pole is formed in the left side portion of the yoke 53 and the north pole is formed in the right side portion of the yoke 53 (see Ib in FIG. 8). Then, the south pole of the plunger 51 repels the south pole formed in the yoke 53, and the spring force of the compression spring 28 is added to the repelling force. With this force, the lock pin 21 secured to the plunger 51 is retracted from the lock hole 29.

Figure 13:
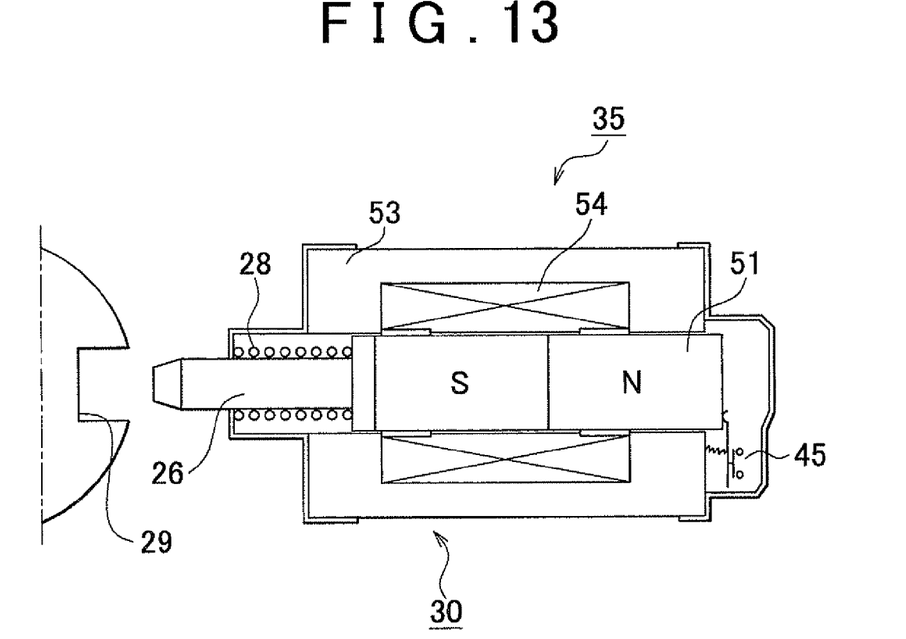
FIG. 13 is a state where the lock pin has retracted from the lock end in FIG. 12 and the lock detection switch is turned off.
Figure 14:
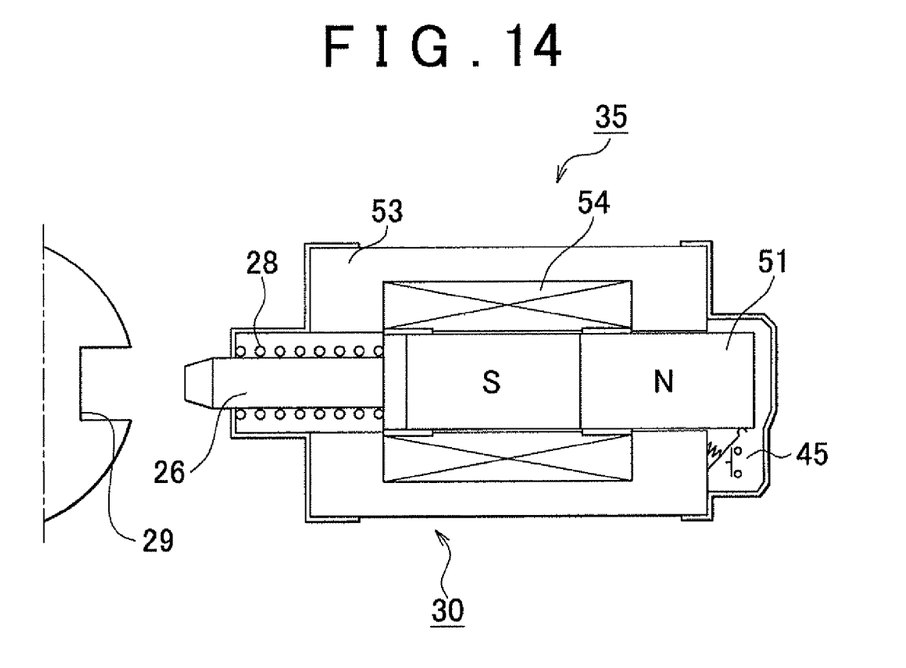
FIG. 14 is a state where the lock pin has further retracted and come close to the unlock end.

When the plunger 51 is retracted to a predetermined position (P5 in FIG. 8), the lock detection switch 45 is turned off as shown in FIG. 13. Therefore, based on a signal from the lock detection switch 45 and a value indicated by the lock pin retraction checking timer Tr2, electric current application to the coil 54 of the actuator 30 is stopped by the ECU 40. However, at this time, the plunger 51 is retracted to the unlock end P1 by a resultant of a spring force of the compression spring 28 and a magnetic force that acts between the plunger 51 and the yoke 53 (see FIG. 14).

Figure 15:
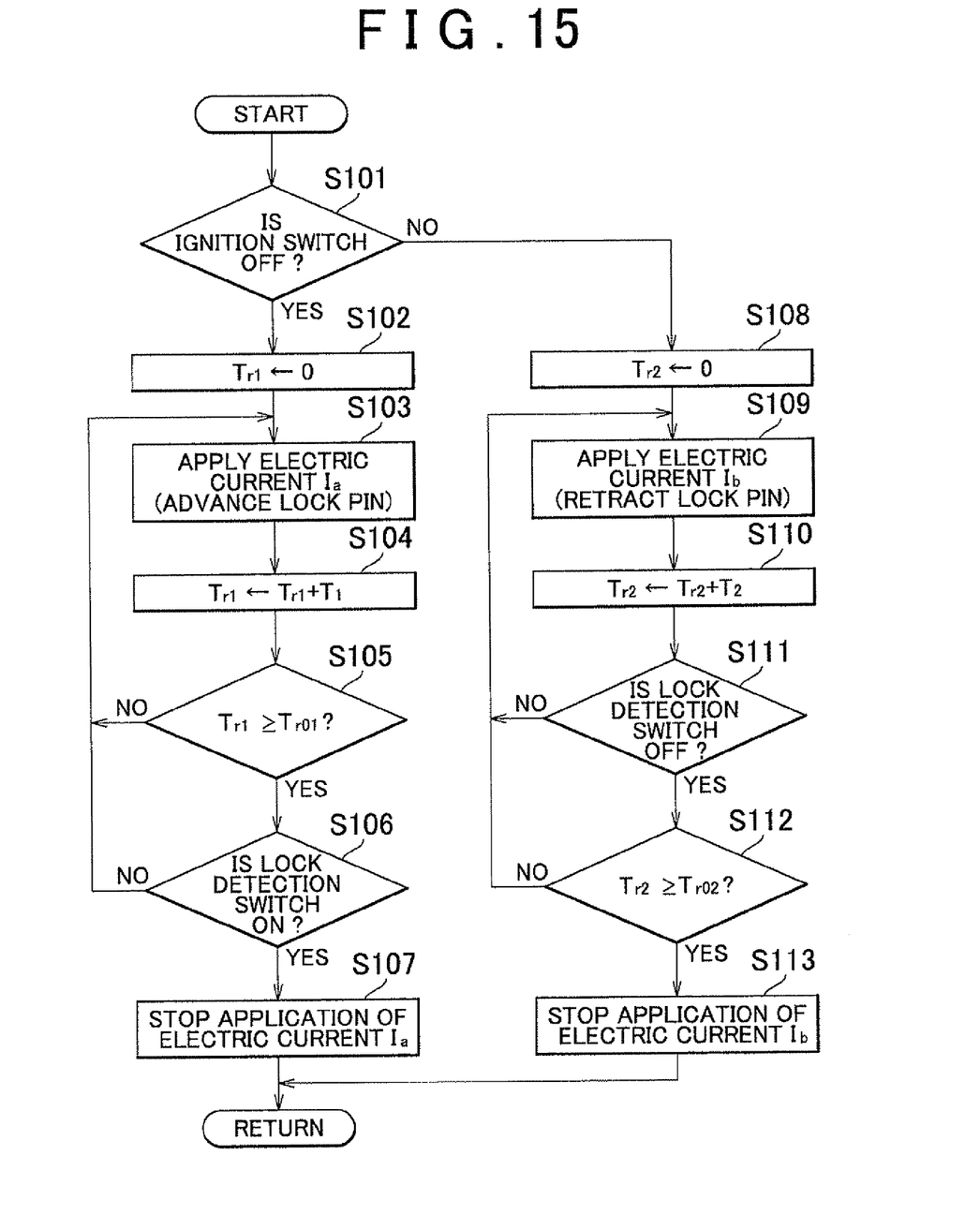
FIG. 15 is a flowchart showing an operation of the steering lock device.

Next, the operations of the steering lock device 35 and the ECU 40 will be described in detail with reference to a flowchart shown in FIG. 15. First, it is determined whether the ignition switch 44 is off (step 101). If it is determined in step 101 that the ignition switch 44 is off (YES in step 101), the lock pin advance checking time Tr1 is reset (step 102: Tr1=0).

Next, electric current is applied to the coil 54 of the solenoid 30 in such a direction that the lock pin 26 is advanced (step 103: apply current Ia). Further, the lock pin advance checking timer Tr1 is incremented (step 104: Tr1=Tr1+T1).

Next, it is determined whether the value indicated by the lock pin advance checking time Tr1 is equal to or larger than a predetermined value (step 105: Tr1≧Tr01). If the value indicated by the lock pin advance checking timer Tr1 is equal to or larger than the predetermined value (YES in step 105: Tr1≧Tr01), it is determined whether the lock detection switch 45 is on (step 106).

If the lock detection switch 54 is on (YES in step 106), electric current application to the coil 54 of the actuator 30 is stopped (step 107: stop application of current Ia), after which the process ends. Thus, the lock pin 26 is engaged with the lock hole 29, whereby the locked state is achieved. If the value indicated by the lock pin advance checking time Tr1 is smaller than the predetermined value (NO in step 105: Tr1<Tr01), or if the lock detection switch 45 is off (NO in step 106), step 103 is executed again to apply electric current to the coil 54 of the actuator 30 in such a direction that the lock pin 26 is advanced (step 103:apply current Ia).

If it is determined in step 101 that the ignition switch 44 is on (NO in step 101), the lock pin retraction checking time Tr2 is reset (step 108: Tr2=0).

Then, electric current is applied to the coil 54 of the actuator 30 in such a direction that the lock pin 26 is retracted (step 109: apply current Ib). In addition, the lock pin retraction checking time Tr2 is incremented (step 110: Tr2=Tr2+T2).

Next, it is determined whether the lock detection switch 45 is off (step 111). If the lock detection switch 45 is off (YES in step 111), it is determined whether the value indicated by the lock pin retraction checking time Tr2 is equal to or larger than a predetermined value (step 112: Tr2≧Tr02). If the value indicated by the lock pin retraction checking time Tr2 is equal to or larger than the predetermined value (YES in step 112: Tr2≧Tr02), electric current application to the coil 54 of the actuator 30 is stopped (step 113: stop application of current Ib), after which the process ends. Thus, the lock pin 26 is disengaged from the lock hole 29, whereby the unlocked state is achieved.

If the lock detection switch 45 is on (NO in step 111), or if the value indicated by the lock pin retraction checking timer Tr2 is smaller than the predetermined value (NO in step 112: Tr2<Tr02), step 109 is executed again to apply electric current to the coil 54 of the actuator 30 in such a direction that the lock pin 26 is retracted (step 109: apply current Ib).

According to the present embodiment, the following operations and effects are obtained. The steering lock device 35 is configured such that, when the ignition switch is turned on, electric current is applied to the coil 54 of the actuator 30 in such a direction that the lock pin 26 secured to the plunger 51 moves away from the ring 31 that has a plurality of lock holes 29 in its periphery and that is fitted to the output shaft 25 of the electric motor 24. In addition, the urging member for increasing a force for moving the lock pin 26 away from the ring 31 is provided.

With the configuration described above, when the ignition switch 44 is on, in other words, when the steering wheel 3 is being operated, the unlocked state is maintained by a spring force of the urging member.

With the configuration described above, even if electric current application to the coil is stopped due to an electrical problem (for example, breakage of a harness, disconnection of a connector, or an instantaneous drop of battery voltage), it is possible to maintain the disengaged state by retracting the lock member using the urging member.

As a result, even if electric current application is stopped, the lock member is maintained in the disengaged state.

In addition, the steering lock device 35 is configured such that, when the ignition switch is turned off, electric current is applied to the coil 54 of the actuator 30 by the ECU 40 in such a direction that the lock pin 26 secured to the plunger 51 is engaged with the ring 31 that has a plurality of lock holes 29 in its periphery and that is fitted to the output shaft 25 of the electric motor 24.

When the lock detection switch 45 that detects the position of the plunger 51 secured to the lock pin 26 is turned on, electric current application is stopped based on a signal from the lock detection switch 45 and a value indicated by the lock pin advance checking timer Tr1. After that, the lock pin 26 is advanced by a magnetic force acting between the yoke 53 of the actuator 30 and the magnet with one pole pair, which is fitted to the plunger 51, and then engaged with the engagement portion formed in the rotational output member of the electric motor 24.

With the configuration described above, when the lock pin 26 is advanced beyond P4 and approaches P2, even if electric current application to the coil 54 of the actuator 30 is stopped, the lock pin 26 is engaged with the engagement portion formed in the rotational output member of the electric motor 24 by a magnetic force between the plunger 51 formed of the magnet with one pole pair and the yoke 53 made of magnetic material.

As a result, steering lock in the electric power steering system is maintained with lower power consumption.

In the present embodiment, the ring 31 is provided at the output shaft 25 of the motor 24. Accordingly, the engagement force of the lock device 35 is increased by the speed reducer 20. As a result, steering lock is achieved with lower power consumption.

The present embodiment may be modified as follows.

In the present embodiment, the invention is applied to a column assist-type EPS. Alternatively, the invention may be applied to a rack assist-type EPS or a pinion assist-type EPS.

In the present embodiment, the steering lock device is actuated based on the on/off state of the ignition switch. However, how the steering lock device is actuated is not limited to this. The steering lock device may be actuated by a remote controller that uses radio waves or infrared rays.

In the present embodiment, the left side portion of the plunger 51 is the south pole, and the right side portion of the plunger 51 is the north pole. However, as a matter of course, the right side portion of the plunger 51 may be the south pole and the left side portion of the plunger 51 may be the north pole.

In the present embodiment, a magnet with one pole pair is used as the plunger 51. Alternatively, a magnet with two or more pole pairs may be used as the plunger 51.

If the steering lock device according to the present embodiment is applied to a hybrid vehicle, a plug hybrid vehicle or a electric vehicle having a large-capacity battery, it is possible to maintain steering lock state for a long period of time.

According to the invention, it is possible to provide a lock device that is able to maintain a lock member in the disengaged state and to reliably maintain the locked state with low power consumption while operating a lock cancellation maintaining member using an electric drive unit without being affected by an electrical trouble.

What is claimed is:

1. A lock device that restricts movement of a movable body, comprising:
    a lock member that is engageable with an engagement portion formed at the movable body;
    an urging member that urges the lock member in a direction away from the engagement portion; and
    an actuator that moves the lock member toward the engagement portion to engage the lock member with the engagement portion against an urging force generated by the urging member, wherein
    the actuator includes:
    a plunger that is connected to the lock member, and that is formed of a magnet with one pole pair;
    a coil that produces a magnetic field;
    a yoke in which a magnetic path for moving the plunger is formed by the magnetic field produced by the coil, and
    an electric current application unit that applies electric current to the coil.

2. The lock device according to claim 1, further comprising:
    a lock detection unit that detects an immediately-before-engaged state that is a state achieved immediately before an engaged state in which a tip of the lock member reaches a lock end,
    wherein when the lock detection unit detects the immediately-before-engaged state, application of electric current to the coil by the electric current application unit is stopped.

3. The lock device according to claim 2, wherein when the lock member is shifted from the engaged state to a disengaged state, the actuator reverses a direction in which electric current is applied to the coil by the electric current application unit such that the lock member is moved away from the engagement portion.

4. The lock device according to claim 1, wherein when the lock member is shifted from the engaged state to a disengaged state, the actuator reverses a direction in which electric current is applied to the coil by the electric current application unit such that the lock member is moved away from the engagement portion.

5. An electric power steering system, comprising:
    a steering mechanism that steers a wheel upon operation of a steering wheel;
    a speed reducer that is attached to the steering mechanism;
    an electric motor of which an output shaft is connected to the speed reducer;
    a movable body that is provided at the output shaft; and
    a lock device that restricts movement of the movable body;
    wherein the lock device includes
    a lock member that is engageable with the engagement portion formed at the output shaft,
    an urging member that urges the lock member in a direction away from the engagement portion, and
    an actuator that moves the lock member toward the engagement portion to engage the lock member with the engagement portion against an urging force generated by the urging member, wherein
    the actuator includes:
    a plunger that is connected to the lock member, and that is formed of a magnet with one pole pair;
    a coil that produces a magnetic field;
    a yoke in which a magnetic path for moving the plunger is formed by the magnetic field produced by the coil; and
    an electric current application unit that applies electric current to the coil.

6. The electric power steering system according to claim 5, wherein:
   a lock detection unit that detects an immediately-before-engaged state that is a state achieved immediately before an engaged state in which a tip of the lock member reaches a lock end; and
   when the lock detection unit detects the engaged state, application of electric current to the coil by the electric current application unit is stopped.

7. The electric power steering system according to claim 6, wherein when the lock member is shifted from the engaged state to a disengaged state, the actuator reverses a direction in which electric current is applied to the coil by the electric current application unit such that the lock member is moved away from the engagement portion.

8. The electric power steering system according to claim 5, wherein when the lock member is shifted from the engaged state to a disengaged state, the actuator reverses a direction in which electric current is applied to the coil by the electric current application unit such that the lock member is moved away from the engagement portion.

\* \* \* \* \*